United States Patent
Abbay et al.

(10) Patent No.: US 7,969,733 B1
(45) Date of Patent: Jun. 28, 2011

(54) HEAT TRANSFER SYSTEM, METHOD, AND COMPUTER PROGRAM PRODUCT FOR USE WITH MULTIPLE CIRCUIT BOARD ENVIRONMENTS

(75) Inventors: Samuel Abbay, San Francisco, CA (US); Jeong Hun Kim, Sunnyvale, CA (US); Don Le, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/336,851

(22) Filed: Dec. 17, 2008

(51) Int. Cl.
*H05K 7/20* (2006.01)

(52) U.S. Cl. ........ 361/695; 361/699; 361/719; 361/721; 174/15.1; 174/16.1; 165/80.3; 165/80.4; 165/104.33

(58) Field of Classification Search .................. None
See application file for complete search history.

(56) References Cited

U.S. PATENT DOCUMENTS

| | | | |
|---|---|---|---|
| 5,276,584 A * | 1/1994 | Collins et al. ................. | 361/718 |
| 6,108,206 A * | 8/2000 | Criniti et al. .................. | 361/704 |
| 6,411,511 B1 * | 6/2002 | Chen ............................. | 361/697 |
| 6,515,862 B1 * | 2/2003 | Wong et al. .................... | 361/710 |
| 6,668,910 B2 * | 12/2003 | Gawve .......................... | 165/80.3 |
| 6,765,794 B1 * | 7/2004 | Inoue ............................ | 361/695 |
| 6,795,315 B1 * | 9/2004 | Wu et al. ....................... | 361/695 |
| 6,934,152 B1 * | 8/2005 | Barrow ......................... | 361/690 |
| 6,955,212 B1 * | 10/2005 | Hsieh ........................... | 165/80.4 |
| 7,042,734 B2 * | 5/2006 | Hensley et al. ............... | 361/758 |
| 7,248,471 B2 * | 7/2007 | Wabiszczewicz ............. | 361/694 |
| 7,336,490 B2 * | 2/2008 | Harris et al. .................. | 361/704 |
| 7,454,920 B2 * | 11/2008 | Haws ........................... | 62/176.6 |
| 7,564,685 B2 * | 7/2009 | Clidaras et al. ............... | 361/699 |
| 7,619,900 B2 * | 11/2009 | McClure et al. .............. | 361/752 |
| 2004/0233641 A1 * | 11/2004 | Moshayedi ................... | 361/716 |
| 2007/0217151 A1 * | 9/2007 | Lin ............................... | 361/697 |
| 2009/0073655 A1 * | 3/2009 | Takakusaki et al. ........... | 361/696 |
| 2009/0168346 A1 * | 7/2009 | Miyoshi ........................ | 361/695 |
| 2009/0194260 A1 * | 8/2009 | Liao et al. ................ | 165/104.33 |

* cited by examiner

*Primary Examiner* — Boris L Chervinsky
(74) *Attorney, Agent, or Firm* — Zilka-Kotab, PC

(57) ABSTRACT

A heat transfer system, method, and computer program product are provided for use with multiple circuit board environments. In use, a heat transfer component configured to be situated between a first circuit board and a second circuit board is provided. Such heat transfer component is in thermal communication with a first processor of the first circuit board and a second processor of the second circuit board. Furthermore, the heat transfer component is situated between the first circuit board and the second circuit board.

24 Claims, 6 Drawing Sheets

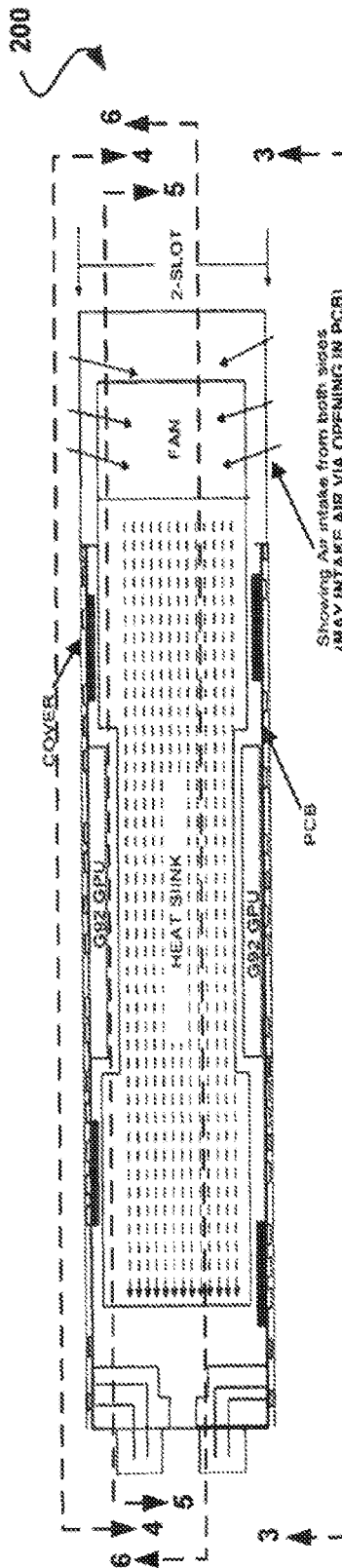
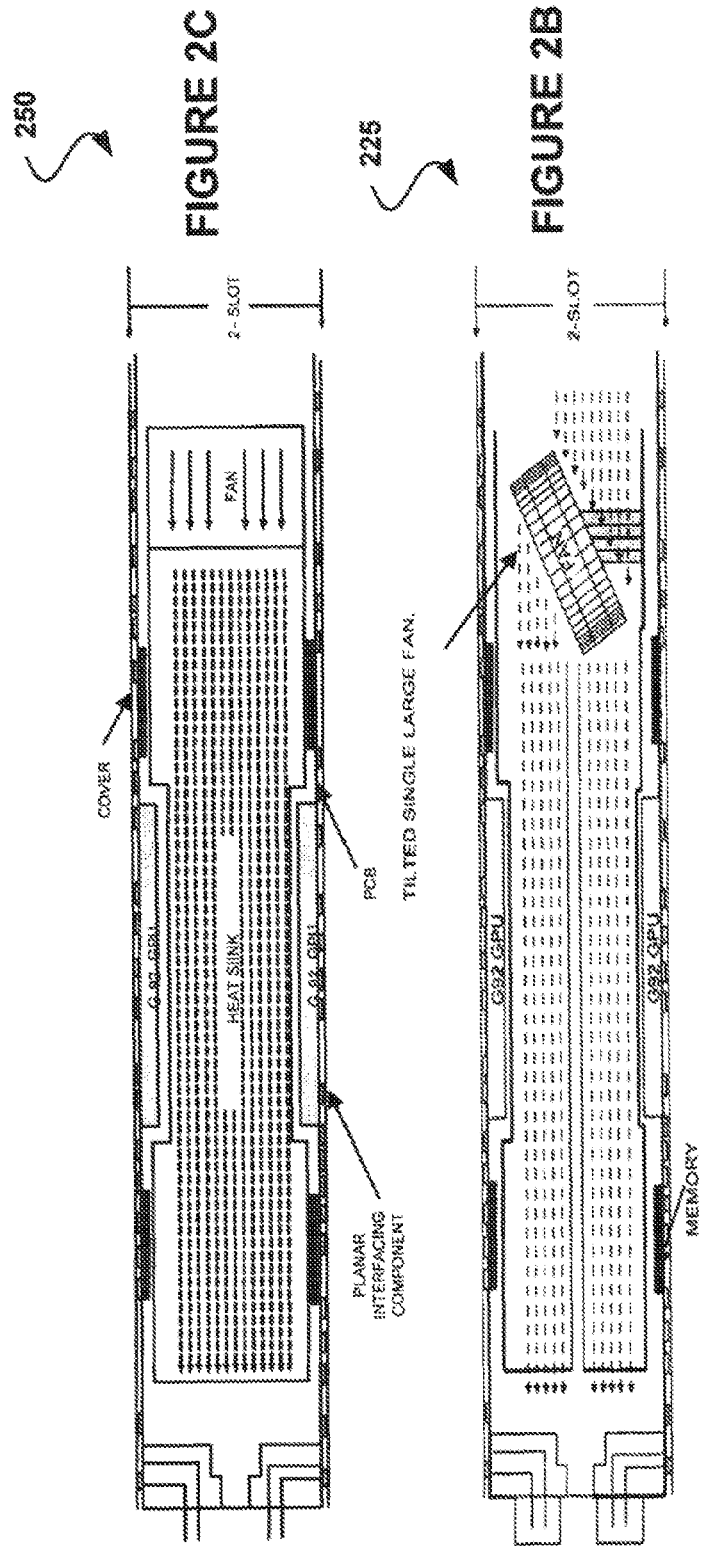
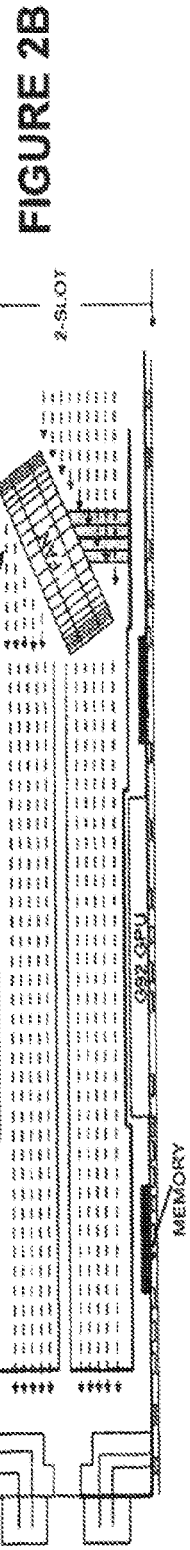

HEAT TRANSFER SYSTEM, METHOD, AND COMPUTER PROGRAM PRODUCT FOR USE WITH MULTIPLE CIRCUIT BOARD ENVIRONMENTS

FIELD OF THE INVENTION

The present invention relates to heat transfer systems, and more particularly to heat transfer systems for use with computing systems.

BACKGROUND

In the past, typical processor circuit boards (e.g. graphics processor boards, etc.) each included a dedicated on-board heat transfer component. Additionally, even dual-processor circuit boards (e.g. boards with two graphic cards, etc.) utilized a dedicated on-board heat transfer component. Thus, a single heat transfer component was utilized for controlling a temperature of an associated processor circuit board. However, use of dedicated on-board heat transfer components has been associated with various limitations.

For example, while a problem of cost is inherent with systems, since each processor circuit board has required a dedicated on-board heat transfer component, other problems exist as well. For example, due the typical location of dual-processor circuit boards on a motherboard, one of the processors typically receives cooling air via a "choked" channel (i.e. one which is constrained or obstructed by other motherboard components, etc.). To this end, the processors operate at different temperatures and thus at different speeds. Further, since speed symmetry is often desired among the processors, a performance of one of processor must be manually degraded to obtain such symmetry.

There is thus a need for addressing these and/or other issues associated with the prior art.

SUMMARY

A heat transfer system, method, and computer program product are provided for use with multiple circuit board environments. In use, a heat transfer component configured to be situated between a first circuit board and a second circuit board is provided. Such heat transfer component is in thermal communication with a first processor of the first circuit board and a second processor of the second circuit board. Furthermore, the heat transfer component is situated between the first circuit board and the second circuit board.

BRIEF DESCRIPTION OF THE DRAWINGS

FIGS. 2A-C show heat transfer systems with various heat transfer component configurations for use with multiple circuit board environments, in accordance with other embodiments.

DETAILED DESCRIPTION

Figure 1:
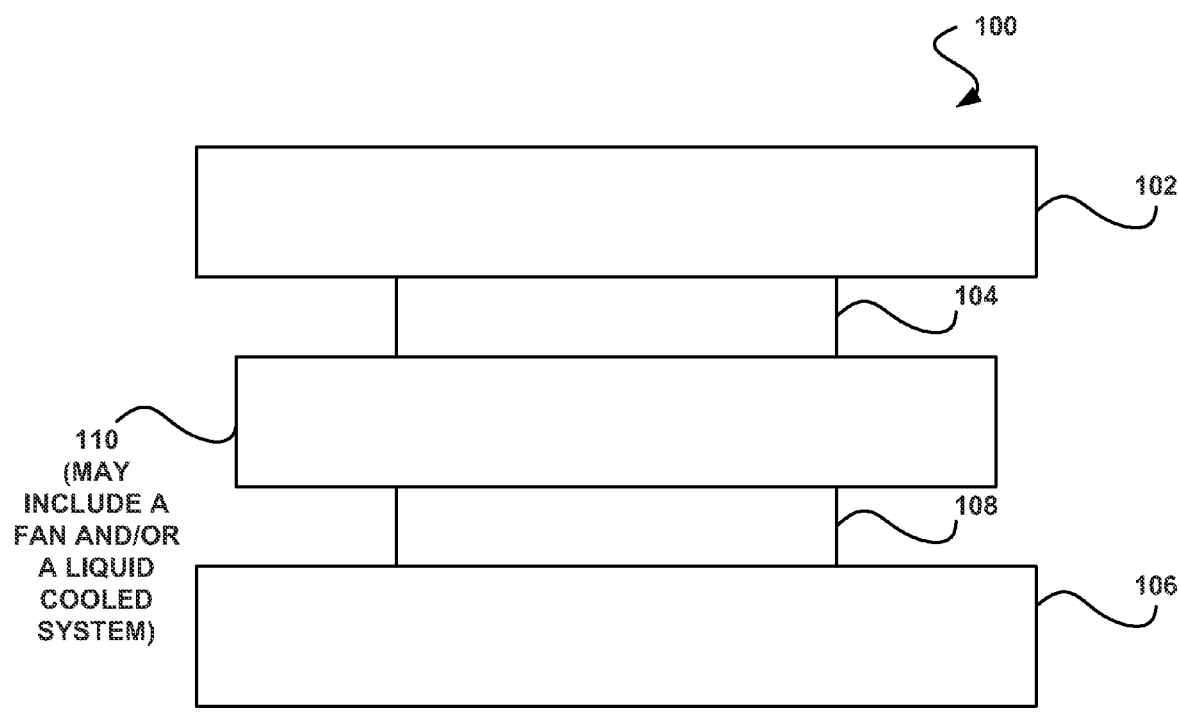
FIG. 1 shows a heat transfer system for use with multiple circuit board environments, in accordance with one embodiment.

FIG. 1 shows a heat transfer system for use with multiple circuit board environments, in accordance with one embodiment. As shown, a first circuit board 102 is provided with a first processor 104 situated thereon. In addition, a second circuit board 106 is provided with a second processor 108 situated thereon.

With respect to the present description, the first circuit board 102 and/or the second circuit board 106 may include any desired type of circuit board [e.g. printed circuit board (PCB)] capable of having at least one respective processor 102, 104 situated thereon. Thus, while only a single first processor 102 is shown as being situated on the first circuit board 102 and only a single second processor 104 is shown as being situated on the second circuit board 106, it should be noted that the first circuit board 102 and/or the second circuit board 106 may have any number of processors (e.g. more than one processor) situated thereon.

In one embodiment, the first circuit board 102 and/or the second circuit board 106 may include a graphics circuit board. In another embodiment, the first circuit board 102 and/or the second circuit board 106 may include a peripheral component interconnect express (PCIE) board. As an option, the first circuit board 102 and/or the second circuit board 106 may be mounted on a motherboard (e.g. of any desired type of computing device).

Additionally, the first processor 104 and/or the second processor 108 may include a graphics processor, in one embodiment. For example, the first processor 104 and/or the second processor 108 may include a graphics processing unit (GPU). Of course, however, the first processor 104 and/or the second processor 108 may include any desired type of processor utilized for processing data.

Further, the first processor 104 may be situated on the first circuit board 102 and the second processor 108 may be situated on the second circuit board 106 in any manner. For example, the first processor 104 may be situated on the first circuit board 102 such that the first processor 104 is in electrical communication with first circuit board 102, and the second processor 108 may be situated on the second circuit board 106 such that the second processor 108 is in electrical communication with the second circuit board 106.

As another example, the first processor 104 may be situated on the first circuit board 102 such that the first processor 104 is in electrical communication with other components (e.g. memory, input/output components, etc.) situated on the first circuit board 102 (e.g. via the first circuit board 102). Similarly, the second processor 108 may optionally be situated on the second circuit board 106 such that the second processor 108 is in electrical communication with other components situated on second circuit board 106 (e.g. via the second circuit board 106).

As also shown, a heat transfer component 110 is situated between the first circuit board 102 and the second circuit board 106 and is in thermal communication with the first processor 104 and the second processor 108. As noted above, the first circuit board 102 and/or the second circuit board 106 may have a plurality of processors situated thereon, and therefore such processors may optionally be in thermal communication with the heat transfer component 110.

With respect to the present description, the heat transfer component 110 may include any component capable of transferring heat with respect to the first processor 104 and the second processor 108. For example, the heat transfer component 110 may cool the first processor 104 and the second processor 108 (e.g. by reducing a temperature thereof).

To this end, the heat transfer component 110 may be in thermal communication with the first processor 104 and the second processor 108 for transferring heat with respect to the first processor 104 and the second processor 108. As an option, the heat transfer component 110 may be in thermal communication with the first processor 104 and the second processor 108 for controlling a temperature thereof. Just by way of example, if a temperature of the first processor 104 and/or the second processor 108 meets a predefined threshold temperature, the heat transfer component 110 may be enabled for transferring heat with respect to the first processor 104 and the second processor 108 such that the temperature of the first processor 104 and/or the second processor 108 is controlled.

In one embodiment, the heat transfer component 110 may include an active heat transfer component. Optionally, the heat transfer component 110 may include a fan. As another option, the heat transfer component 110 may include a liquid cooled system.

In another embodiment, the heat transfer component 110 may include a passive heat transfer component. For example, the heat transfer component 110 may include a heat sink. In yet another embodiment, the heat transfer component 110 may include a heat sink with a fan positioned on an end thereof.

To this end, the first processor 104 situated on the first circuit board 102 and the second processor 108 situated on the second circuit board 106 may optionally share the heat transfer component 110. Accordingly, a temperature of the first processor 104 and the second processor 108 may both be regulated by the heat transfer component 110.

As an option, the heat transfer component 110 may be in thermal communication with both the first processor 104 and the second processor 108 for ensuring at least a substantially symmetrical temperature therebetween. Just by way of example, the heat transfer component 110 may include a fan which allows the first processor 104 and also the second processor 108 to receive freshly vented air for ensuring the temperature symmetry. As a result of the temperature symmetry, similar performance across the first processor 104 and the second processor 108 may be maintained (e.g. where such performance is a function of the temperature).

As another option, reduced cost and increased reliability may be provided via the use of the single heat transfer component 110 among the first processor 104 and the second processor 108. For example, by utilizing the single heat transfer component 110 among the first processor 104 and the second processor 108 (as opposed to use of a plurality of heat transfer components, each one dedicated to one of the first processor 104 and the second processor 108), use of any heat transfer component 110 by the first processor 104 and the second processor 108 beyond the heat transfer component 110 shown may be eliminated for reducing a cost of manufacturing the system 100. As another example, by utilizing the single heat transfer component 110 (as opposed to use of a plurality of dedicated heat transfer components), reliability of the system 100 may also be increased.

As yet another option, increased performance may be provided via the use of the single heat transfer component 110 among the first processor 104 and the second processor 108. For example, use of such single heat transfer component 110 may allow the heat transfer component 110 to be larger in size than multiple dedicated heat transfer components are otherwise utilized. The larger heat transfer component 110 may, in turn, provide increased performance, such as increased air flow capability, for example.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIGS. 2A-C show heat transfer systems 200-250 with various heat transfer component configurations for use with multiple circuit board environments, in accordance with other embodiments. As an option, the heat transfer systems 200-250 may be implemented in the context of the heat transfer system 100 of FIG. 1. Of course, however, the heat transfer systems 200-250 may be implemented in any desired environment. It should also be noted that the aforementioned definitions may apply during the present description.

As shown in FIGS. 2A-C, each of the heat transfer systems 200-250 include two GPUs, each situated on a different circuit board (e.g. PCB, as shown). While GPUs are shown, it should be noted that any desired type of processors may be provided in the various heat transfer systems 200-250 shown, with respect to FIGS. 2A-C. The circuit boards are located on opposite outer edges of each of the heat transfer systems 200-250.

Memory is also situated on each of the circuit boards. The memory may include any desired type of memory, such as random access memory (RAM), etc. Further, the circuit boards include a plurality of planar interfacing components which interface the various components situated on the circuit boards. For example, the planar interfacing components may abut one of the circuit boards and an associated one of the GPUs, for providing an electrical connection therebetween. As another example, the planar interfacing components may abut one of the circuit boards and an associated one of the memories, for providing an electrical connection therebetween.

Still yet, the circuit boards may each include a cover. The cover may include a plate which covers an outer surface of an associated circuit board. For example, the cover may provide a covering to the planar interfacing components of the associated circuit board, for example.

Further, each of the heat transfer systems 200-250 include a plurality of input/output components. The input/output components may include input/output interfaces, in one embodiment. Just by way of example, the input/output components may provide an interface [e.g. a digital visual interface (DVI), a high-definition multimedia interface (HDMI), etc.] between one of the circuit boards and an input/output device. Such input/output device may include a display, as an option.

As also shown, each of the heat transfer systems 200-250 include a heat transfer component situated between the circuit boards. The heat transfer component includes a heat sink and a fan. The heat sink may be situated directly between (e.g. be in thermal communication with) the circuit boards for dissipating, absorbing, etc. heat from the GPUs situated on the circuit boards.

As an option, planar heat conductive surfaces (not shown) are also provided between the components situated on the circuit boards and the heat sink. For example, at least one planar heat conductive surface may be situated between each GPU and the heat sink, for allowing thermal communication between the GPU and the heat sink. Similarly, at least one planer heat conductive surface may be situated between each memory and the heat sink, for allowing thermal communication between the memory and the heat sink.

Additionally, the fan may be situated indirectly between the GPUs. For example, the fan may be situated at an end of the heat sink. As shown, the fan may be situated at an end of the heat transfer systems 200-250, opposite the end of the heat transfer systems 200-250 that includes the input/output components.

To this end, the fan may optionally funnel air through the heat sink situated between the GPUs, toward the input/output components, for cooling a temperature of the GPUs. As another option, either or both of the circuit boards may include at least one opening 255. Accordingly, the fan may funnel air via such opening 255. Of course, however, the fan may output air in any desired manner capable of affecting a temperature of the GPUs.

In one embodiment, as shown in FIG. 2A, the fan may intake air from a plurality of sides of the fan (e.g. sides planar to the circuit boards). Further, the fan may output the air from yet another side of the fan, such as the side facing the heat sink for funneling air through the heat sink. In other embodiments, as shown in FIGS. 2B-2C, the fan may intake air from a single side of the fan (e.g. a side of the fan facing an outer end of the heat transfer system 225-250), and may output the air from another side of the fan, such as the side facing the heat sink for funneling air through the heat sink.

Moreover, as shown in FIG. 2C, the fan may include an axis of rotation that is at least substantially parallel with a first plane associated with one of the circuit boards and a second plane associated with the other one of the circuit boards. In this way, the fan may optionally funnel the air parallel with respect to the circuit boards, and thus parallel with respect to the heat sink.

As another option, as shown in FIG. 2B, the fan may include an axis of rotation that forms an acute angle with respect to at least one of a first plane associated with one of the circuit boards and a second plane associated with the other one of the circuit boards. Accordingly, the fan may optionally funnel the air at an angle through the heat sink.

Moreover, by situating the fan at such an angle, a size of the fan may be larger than a size of the fan that includes the axis of rotation that is at least substantially parallel with the first plane associated with one of the circuit boards and the second plane associated with the other one of the circuit boards. For example, a length of the fan shown in FIG. 2C may be limited to the distance between the circuit boards. It should be noted that the fan shown in FIG. 2A may be situated in any of the manners described above with respect to FIGS. 2B-2C.

In one embodiment, a plurality of fins (not shown) may be formed between the circuit boards of the heat transfer systems 200-250. For example, the fins may be components of the heat sink. The fins may be linear, arcuate, etc. (e.g. with respect to the circuit boards). In addition, the fins may be connected to a surface of each of the GPUs facing the heat sink. Thus, the fins may optionally span across the heat sink from one of the GPUs to the other one of the GPUs.

As an option, the fins may be utilized for absorbing heat generated by the GPUs. By optionally situating the circuit boards on differing sides of the fins, and thus on differing sides of the heat sink, the fins may be at least substantially heated uniformly. Furthermore, the fins may be cooled by transferring heat associated therewith to the air flowing through the heat sink from the fan. For example, the amount of heat transferred to the air may be directly proportional to the temperature difference between the heated fins and the air.

In yet another embodiment, the heat transfer component may be constructed for attenuating (e.g. reducing, etc.) noise generated by the fan. For example, the heat transfer component may be situated between the circuit boards, such that the circuit boards may act as a housing for the heat transfer component. To this end, air funneled through the heat transfer component (e.g. through the heat sink) may be contained within the housing, for attenuating a noise level produced by the heat transfer systems 200-250 via the fan.

Figure 3:
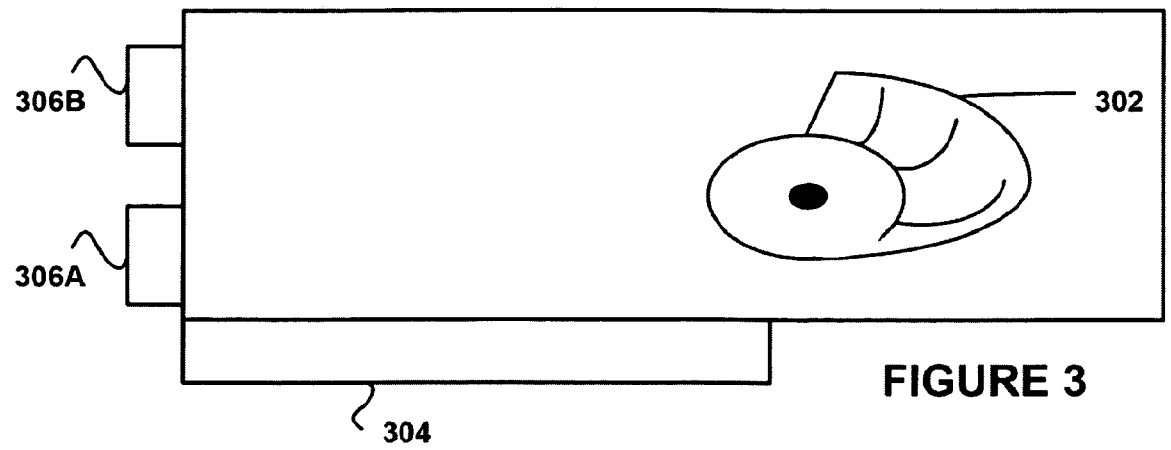
FIG. 3 shows a cross-section of a first outer edge of the heat transfer system of FIG. 2A, in accordance with yet another embodiment.

FIG. 3 shows a cross-section taken across line 3-3 shown in FIG. 2A of a first outer edge of the heat transfer system 200 of FIG. 2A, in accordance with yet another embodiment. Again, it should be noted that the aforementioned definitions may apply during the present description.

As shown, the heat transfer system 200 includes a fan 302 for pushing air through a heat sink of the heat transfer system 200. The fan 302 may push the air towards a plurality of input/output components 306A-B of the heat transfer system 200. For example, the fan 302 may intake the air from a surface of the fan 302 that is opposite a surface of the fan facing the input/output components 306A-B. The fan may further output the air from the surface of the fan facing the input/output components 306A-B.

In one embodiment, the fan 302 may be included in a heat transfer component of the heat transfer system 200. The heat transfer component may also include a heat sink. Such heat sink may be located between the fan 302 and the input/output components 306A-B. Thus, the air flowing from the fan 302 may be pushed through the heat sink towards the input/output components 306A-B.

The heat transfer system 200 also includes a GPU 304. As shown, the GPU 304 may be located on a first outer edge of the heat transfer component of the heat transfer system 200. For example, the GPU 304 may be located on a first outer edge of the heat sink. The GPU 304 may be in thermal communication with the heat sink via a plurality of fins of the heat sink, as an option. To this end, the air flowing through the heat sink may be in contact with the GPU 304 (or optionally with a planar heat conductive surface connected between the GPU 304 and the heat sink) for adjusting a temperature of the GPU 304.

Figure 4:
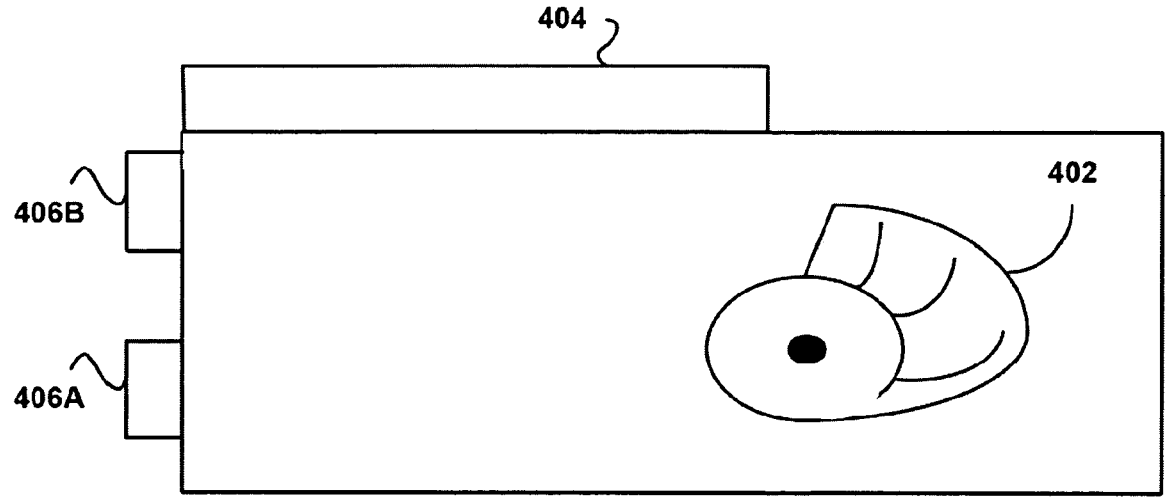
FIG. 4 shows a cross-section of a second outer edge of the heat transfer system of FIG. 2A, in accordance with yet another embodiment, in accordance with still yet another embodiment.

FIG. 4 shows a cross-section taken across line 4-4 shown in FIG. 2A of a second outer edge of the heat transfer system 200 of FIG. 2A, in accordance with yet another embodiment, in accordance with still yet another embodiment. Yet again, it should be noted that the aforementioned definitions may apply during the present description.

As shown, the heat transfer system 200 includes a fan 402 for pushing air through a heat sink of the heat transfer system 200. The fan 402 may push the air towards a plurality of input/output components 406A-B of the heat transfer system 200. For example, the fan 402 may intake the air from a surface of the fan 402 that is opposite a surface of the fan facing the input/output components 406A-B. The fan may further output the air from the surface of the fan facing the input/output components 406A-B.

In one embodiment, the fan 402 may be included in a heat transfer component of the heat transfer system 200. The heat transfer component may also include a heat sink. Such heat sink may be located between the fan 402 and the input/output components 406A-B. Thus, the air flowing from the fan 402 may be pushed through the heat sink towards the input/output components 406A-B.

The heat transfer system 200 also includes a GPU 404. As shown, the GPU 304 may be located on a second outer edge of the heat transfer component of the heat transfer system 200. For example, the GPU 404 may be located on a second outer edge of the heat sink. The GPU 404 may be in thermal communication with the heat sink via a plurality of fins of the heat sink, as an option. To this end, the air flowing through the heat sink may be in contact with the GPU 404 (or optionally with a planar heat conductive surface connected between the GPU 404 and the heat sink) for adjusting a temperature of the GPU 404.

Figure 5:
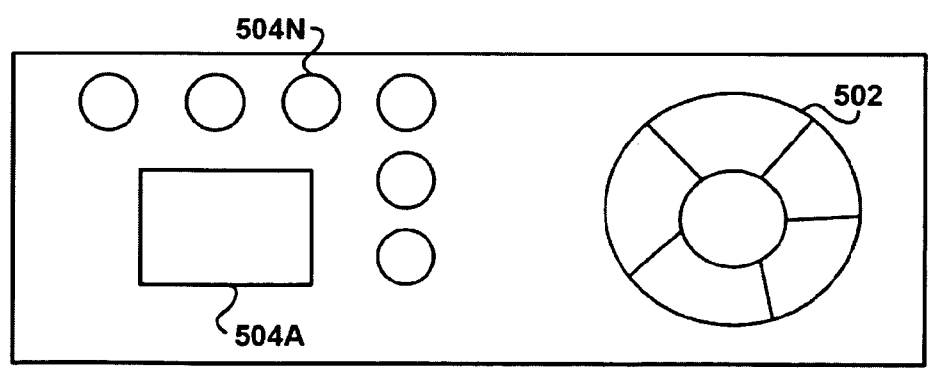
FIG. 5 shows a cross-section of an outer edge of the heat transfer component of the heat transfer system of FIG. 2A, in accordance with yet another embodiment.

FIG. 5 shows a cross-section taken across line 5-5 shown in FIG. 2A of an outer edge of the heat transfer component of the heat transfer system 200 of FIG. 2A, in accordance with yet another embodiment. Again, it should be noted that the aforementioned definitions may apply during the present description.

As shown, the heat transfer component includes a fan 502. With respect to the present embodiment, the fan 502 may be utilized for pushing air through a heat sink of the heat transfer component. Thus, the fan 502 may be utilized for reducing a temperature of GPUs in thermal communication with the heat sink.

Additionally, the heat transfer component interfaces with a plurality of planar heat conductive surfaces 504A-N. In one embodiment, a first face of each of such planar heat conductive surfaces 504A-N may be in contact with the heat transfer component. For example, the first face of such planar heat conductive surfaces 504A-N may be in contact with the heat sink of the heat transfer component.

In another embodiment, a second face of each of the planar heat conductive surfaces 504A-N may be in contact with components situated on a circuit board. The components may include a GPU, memory, etc. Accordingly, the planar heat conductive surfaces 504A-N may interface the heat transfer component (e.g. the heat sink) and the components situated on the circuit board.

Such interface may allow heat to be transferred from the components situated on the circuit board to the heat transfer component. Just by way of example, planar heat conductive surfaces 504A-N may allow heat to be transferred from the components situated on the circuit board to the heat sink of the heat transfer component. Moreover, the air flowing to the heat sink from the fan 502 may cool the heat sink, for eliminating the heat transferred thereto by the components situated on the circuit board.

Figure 6:
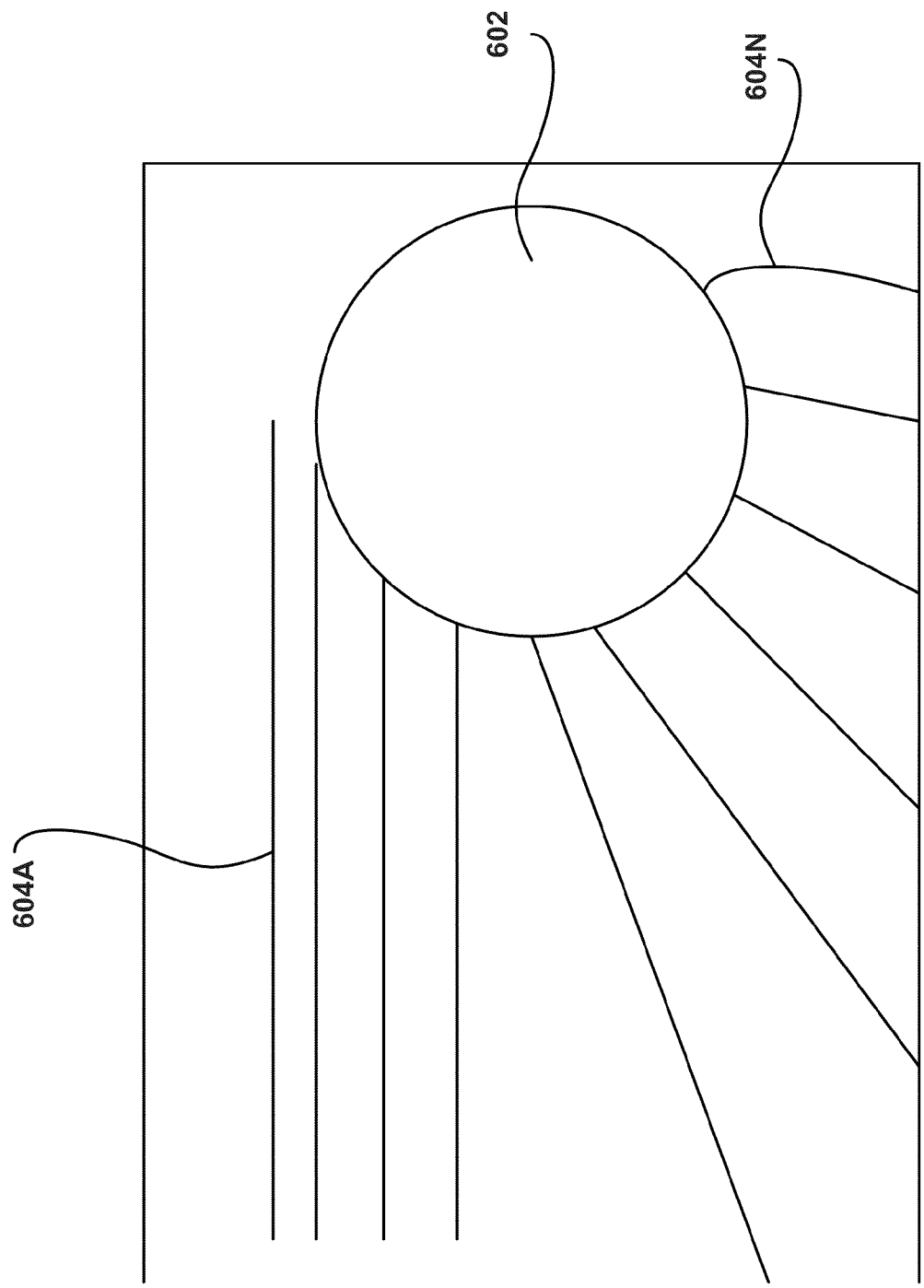
FIG. 6 shows a cross-section of a heat transfer component of the heat transfer system of FIG. 2A, in accordance with another embodiment.

FIG. 6 shows a cross-section taken across line 6-6 shown in FIG. 2A of a heat transfer component of the heat transfer system 200 of FIG. 2A, in accordance with another embodiment. Again, it should be noted that the aforementioned definitions may apply during the present description.

As shown, the heat transfer component includes a fan 602. The heat transfer component also includes a plurality of fins 604A-N. For example, a heat sink of the heat transfer component may include the fins 604A-N.

As also shown, a first subset of the fins 604A-N may be linear (e.g. see fin 604A). Just by way of example, the first subset of the fins 604A-N may be linearly situated between the circuit boards of the heat transfer system of FIG. 2A. In addition, a second subset of the fins 604A-N may be arcuate (e.g. see fin 604N). For example, the second subset of the fins 604A-N may be arcuately situated between the circuit boards of the heat transfer system of FIG. 2A.

The fan 602 may intake air via a surface of the fan 602 facing opposite a surface of the fan that faces the fins 604A-N. Further, the fan 602 may output the air via the surface of the fan that faces the fins 604A-N. In this way, the fan 602 may optionally funnel the air through the fins 604A-N.

In one embodiment, the fins 604A-N may be in thermal communication with each of the GPUs situated on the circuit boards of the heat transfer system of FIG. 2A. As an option, the fins 604A-N may be in thermal communication with each of the GPUs situated on the circuit boards via the planar heat conductive surfaces 504A-N shown in FIG. 5. For example, the planar heat conductive surfaces 504A-N shown in FIG. 5 may interface the GPUs and the fins 604A-N. To this end, the fins 604A-N may dissipate heat from the GPUs (e.g. via the planar heat conductive surfaces 504A-N of FIG. 5), and the heat transferred to the fins 604A-N from the GPUs may be dissipated by the air flowing therethrough.

Figure 7:
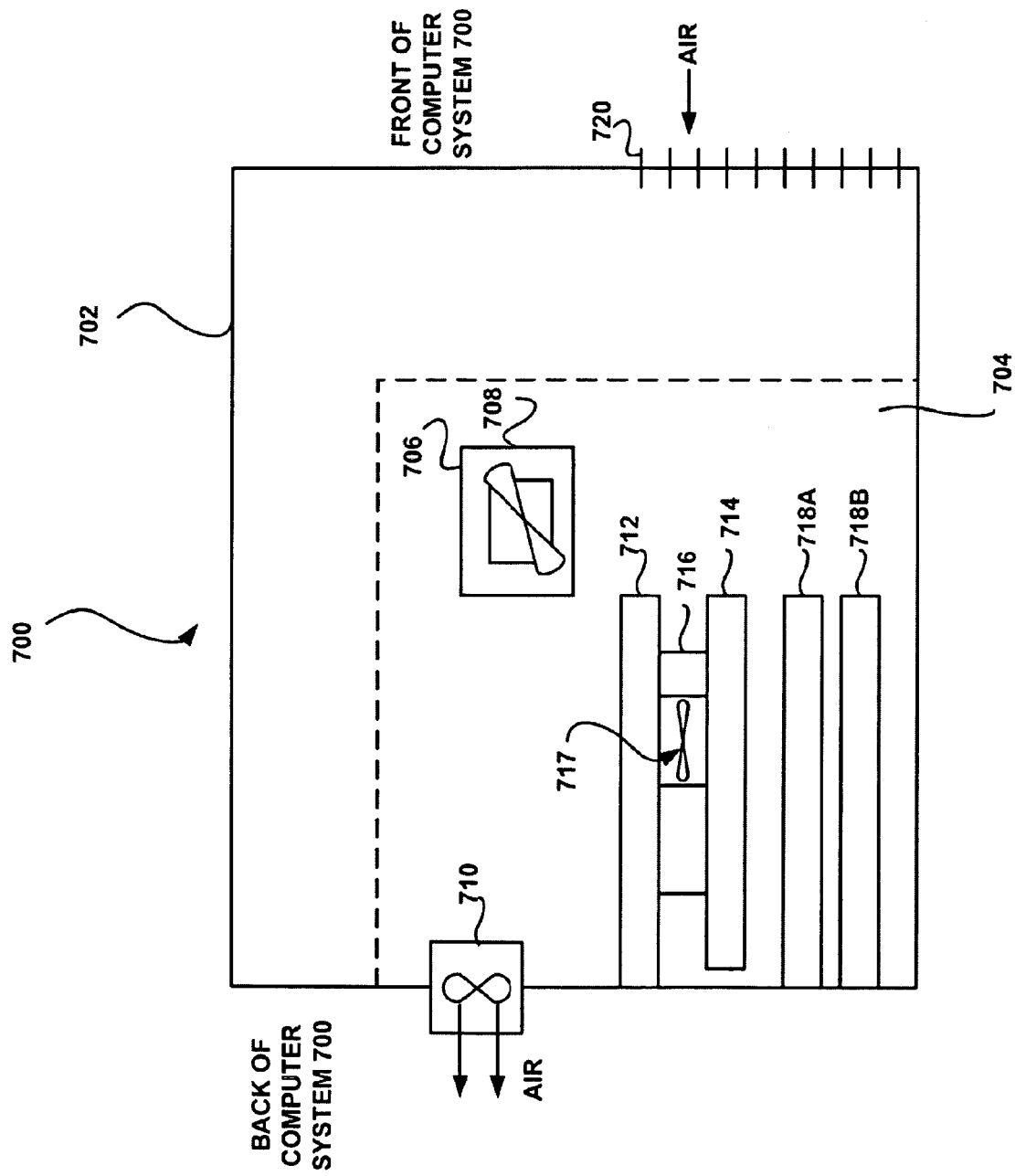
FIG. 7 shows a computer system including a with a heat transfer component for use with multiple graphics cards, in accordance with still yet another embodiment.

FIG. 7 shows a computer system 700 including a with a heat transfer component for use with multiple graphics cards, in accordance with still yet another embodiment. As an option, the computer system 700 may be implemented in the context of the environments of FIGS. 2A-6. Of course, however, the computer system 700 may be implemented in any desired environment. Yet again, it should be noted that the aforementioned definitions may apply during the present description.

As shown, the computer system 700 includes a computer housing 702 for housing a plurality of components. In one embodiment, as shown, the computer housing 702 includes a vent 720 on a front face thereof. The vent 720 may be utilized for allowing air to flow into the computer housing 702 from outside the computer housing 702. In this way, components included in the computer housing 702 may receive a fresh air flow from outside the computer housing 702.

As an option, the air may flow into the computer housing 702 via the vent 720 utilizing a system fan 710. For example, a surface of the system fan 710 facing inside the computer housing 702 may intake air from within the computer housing 702, thereby pulling air into the computer housing 702 via the vent 720. Additionally, a surface of the system fan 710 facing outside the computer housing 702 may output such air to outside of the computer housing 702. Accordingly, air may flow through the computer housing 702.

As also shown, the computer housing 702 houses a motherboard 704. While only the motherboard 702 is shown, it should be noted that the computer housing 702 may house any other desired components of the computer system 700. The motherboard 704 may include a central circuit board of the computer system 700, for example.

In one embodiment, the motherboard 704 may include a central processing unit (CPU) 706. Additionally, the CPU 706 may be associated with a dedicated CPU heat transfer component 708. Such dedicated CPU heat transfer component 708 may include a fan dedicated to managing a temperature (e.g. cooling) the CPU, for example.

In another embodiment, the motherboard 704 may include a plurality of graphics cards 712 and 714 (e.g. graphics circuit boards). With respect to the present embodiment, each of the graphics cards 712 and 714 may include at least one GPU situated thereon. As an option, the graphics cards 712 and 714 on which the GPUs are situated may be in electrical communication with the motherboard 704.

Further, a heat transfer component 716 is situated between the graphics cards 712 and 714. Specifically, with respect to the present embodiment, the heat transfer component 716 is in thermal communication with the GPUs situated on the graphics cards 712 and 714. Thus, the heat transfer component 716 may be utilized for transferring a heat from the GPUs (e.g. to the heat transfer component 716, such as a heat sink (not shown) of the heat transfer component 716).

Still yet, the heat transfer component 716 may include a fan 717. The fan 717 may optionally intake air via a plurality of surfaces thereof. For example, the fan 717 may intake air utilizing a first surface facing one of the graphics cards 712 and a second surface facing the other one of the graphics cards 714. In addition, the fan 717 may output the air as a flow through the heat transfer component 716.

Also included on the motherboard 704 is a plurality of peripheral component interconnect (PCI) cards 718A-B. The PCI cards 718A-B may include network cards, sound cards, modems, etc. It should be noted that while various components of the motherboard 704 have been described hereinabove, the motherboard 704 may include any other desired components.

To this end, the computer system 700 may include a motherboard 704 with a heat transfer component 716 for use with multiple graphics cards 712 and 714. By allowing the fan 717 of the heat transfer component 716 to intake air utilizing two surfaces thereof (e.g. one surface facing the dedicated CPU heat transfer component 708 and the other surface facing the PCI cards 718A-B), the fan 717 may be allowed to intake fresh, cooler air from the air being pulled into the computer housing 702 through the vent 720 (e.g. via the system fan 710 and/or the dedicated CPU heat transfer component 708). Moreover, the fan 710 may also be prevented from adjoining the PCI cards 718A-B, which may otherwise restrict air flow into the intake of the fan 717.

Figure 8:
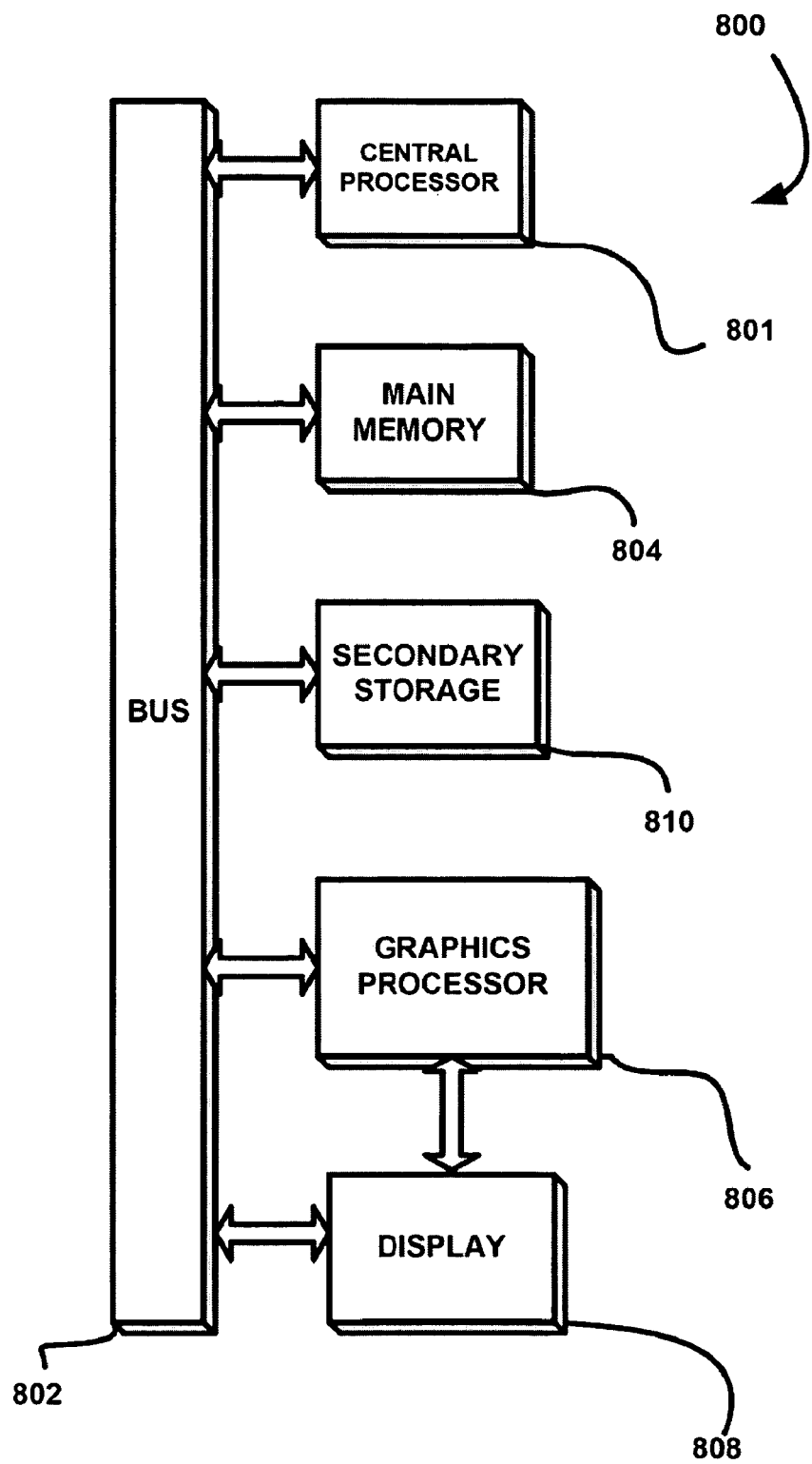
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of RAM.

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a GPU.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices including, but not limited to, a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a first circuit board with a first processor situated thereon;
a second circuit board with a second processor situated thereon; and
a heat transfer component situated between the first circuit board and the second circuit board and in thermal communication with the first processor and the second processor;
wherein the heat transfer component includes a single heat transfer element in direct thermal communication with the first processor and the second processor;
wherein a fan positioned between the first circuit board and the second circuit board intakes air via at least one opening formed in at least one of the first circuit board and the second circuit board, and funnels the air via the heat transfer component.

2. The apparatus of claim 1, wherein the first processor and the second processor include graphics processors.

3. The apparatus of claim 2, wherein the graphics processors include graphics processing units.

4. The apparatus of claim 1, wherein the heat transfer component includes an active heat transfer component.

5. The apparatus of claim 4, wherein the active heat transfer component includes at least one of a fan and a liquid cooled system.

6. The apparatus of claim 1, wherein heat transfer component includes a passive heat transfer component.

7. The apparatus of claim 6, wherein the passive heat transfer component includes a heat sink.

8. The apparatus of claim 1, wherein at least one of the first circuit board and the second circuit board includes a plurality of processors in thermal communication with the heat transfer component.

9. The apparatus of claim 1, wherein the heat transfer component includes a heat sink with the fan positioned on an end thereof.

10. The apparatus of claim 9, wherein the fan includes an axis of rotation that is substantially parallel with a first plane associated with the first circuit board and a second plane associated with the second circuit board.

11. The apparatus of claim 9, wherein the fan includes an axis of rotation that forms an acute angle with respect to at least one of a first plane associated with the first circuit board and a second plane associated with the second circuit board.

12. The apparatus of claim 9, wherein a plurality of fins are formed between the first circuit board and the second circuit board.

13. The apparatus of claim 12, wherein the fins are linear.

14. The apparatus of claim 12, wherein the fins are arcuate.

15. The apparatus of claim 9, wherein the heat transfer component attenuates noise generated by the fan by containing the funneled air within the heat transfer component.

16. The apparatus of claim 1, and further comprising a motherboard, wherein the first circuit board and the second circuit board are mounted on a motherboard.

17. The apparatus of claim 12, wherein the fins span across the heat sink from the first processor to the second processor.

18. The apparatus of claim 12, wherein the fins are connected to a surface of the first processor and a surface of the second processor.

19. The apparatus of claim 1, wherein the heat transfer component situated between the first circuit board and the second circuit board maintains a substantially symmetrical temperature between the first circuit board and the second circuit board, thereby maintaining a substantially similar performance across the first processor and the second processor.

20. The apparatus of claim 7, wherein the air funneled via the heat transfer component flows through the heat sink and is in contact with a planar heat conductive surface connected between at least one of the first processor and the second processor, and the heat sink.

21. The apparatus of claim 7, wherein the air funneled via the heat transfer component flows through the heat sink and is in contact with at least one of the first processor and the second processor.

22. The apparatus of claim 1, wherein the fan intakes air utilizing a first surface facing the first circuit board, and a second surface facing the second circuit board.

23. A subsystem, comprising:
a heat transfer component configured to be situated between a first circuit board and a second circuit board and in thermal communication with a first processor of the first circuit board and a second processor of the second circuit board;
wherein the heat transfer component includes a single heat transfer element in direct thermal communication with the first processor and the second processor;
wherein a fan positioned between the first circuit board and the second circuit board intakes air via at least one opening formed in at least one of the first circuit board and the second circuit board, and funnels the air via the heat transfer component.

24. A method, comprising:
providing a heat transfer component configured to be situated between a first circuit board and a second circuit board and in thermal communication with a first processor of the first circuit board and a second processor of the second circuit board; and
situating the heat transfer component between the first circuit board and the second circuit board;
wherein the heat transfer component includes a single heat transfer element in direct thermal communication with the first processor and the second processor;
wherein a fan positioned between the first circuit board and the second circuit board intakes air via at least one opening formed in at least one of the first circuit board and the second circuit board, funnels the air via the heat transfer component.

* * * * *

UNITED STATES PATENT AND TRADEMARK OFFICE
CERTIFICATE OF CORRECTION

PATENT NO. : 7,969,733 B1
APPLICATION NO. : 12/336851
DATED : June 28, 2011
INVENTOR(S) : Abbay et al.

It is certified that error appears in the above-identified patent and that said Letters Patent is hereby corrected as shown below:

In the claims:
Col. 11, line 14, please replace "hoard." with --board.--;
Col. 12, line 36, please replace "board, funnels" with --board, and funnels--.

Signed and Sealed this
Twenty-seventh Day of September, 2011

David J. Kappos
*Director of the United States Patent and Trademark Office*